US010198248B2

(12) United States Patent
Gulley et al.

(10) Patent No.: US 10,198,248 B2
(45) Date of Patent: Feb. 5, 2019

(54) PARALLEL PROCESSING OF A SINGLE DATA BUFFER

(71) Applicant: Intel Corporation, Santa Clara, CA (US)

(72) Inventors: Sean M. Gulley, Boston, MA (US); Wajdi K. Feghali, Boston, MA (US); Vinodh Gopal, Westborough, MA (US); James D. Guilford, Northborough, MA (US); Gilbert M. Wolrich, Framingham, MA (US); Kirk S. Yap, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 13/631,761

(22) Filed: Sep. 28, 2012

(65) Prior Publication Data

US 2014/0019693 A1  Jan. 16, 2014

Related U.S. Application Data

(60) Provisional application No. 61/670,472, filed on Jul. 11, 2012.

(51) Int. Cl.
*G06F 5/06* (2006.01)
*G06F 21/64* (2013.01)
(Continued)

(52) U.S. Cl.
CPC .............. *G06F 5/06* (2013.01); *G06F 21/64* (2013.01); *H04L 9/0643* (2013.01);
(Continued)

(58) Field of Classification Search
CPC .......... G06F 5/06; G06F 21/64; H04L 9/0643; H04L 9/3236
See application file for complete search history.

(56) References Cited

U.S. PATENT DOCUMENTS 6,018,778 A   1/2000  Stolowitz et al.
7,047,530 B2  5/2006  Lu
(Continued)

FOREIGN PATENT DOCUMENTS

CN   101542962 A   9/2009
CN   102053854 A   5/2011
(Continued)

OTHER PUBLICATIONS

Martijn Sprengers, "GPU-based Password Cracking on the Secruity of Password Hashing Schemes Regarding Advances in Graphics Processing Units", Feb. 2011, Radboud University Nijmegen, Thesis No. 646, all pages.*

(Continued)

*Primary Examiner* — Eric Cardwell
(74) *Attorney, Agent, or Firm* — Barnes & Thornburg LLP

(57) ABSTRACT

Technologies for executing a serial data processing algorithm on a single variable length data buffer includes streaming segments of the buffer into a data register, executing the algorithm on each of the segments in parallel, and combining the results of executing the algorithm on each of the segments to form the output of the serial data processing algorithm.

14 Claims, 4 Drawing Sheets

(51) Int. Cl.
*H04L 9/06* (2006.01)
*H04L 9/32* (2006.01)

(52) U.S. Cl.
CPC ........ *H04L 9/3236* (2013.01); *H04L 2209/12* (2013.01); *H04L 2209/20* (2013.01)

(56) References Cited

U.S. PATENT DOCUMENTS

| | | | |
|---|---|---|---|
| 7,266,825 | B2 | 9/2007 | Lankreijer |
| 7,734,674 | B2 | 6/2010 | Cohen et al. |
| 8,055,970 | B1* | 11/2011 | Smith .................. H04L 9/3236 714/752 |
| 2007/0294510 | A1 | 12/2007 | Stuttard et al. |
| 2008/0165953 | A1 | 7/2008 | Patel |
| 2010/0106976 | A1 | 4/2010 | Achemez et al. |
| 2010/0312801 | A1 | 12/2010 | Ostrovsky et al. |
| 2011/0035426 | A1 | 2/2011 | Chen et al. |
| 2012/0117361 | A1 | 5/2012 | Archer et al. |
| 2013/0332742 | A1* | 12/2013 | Gueron .................. G09C 1/00 713/189 |
| 2014/0019694 | A1 | 1/2014 | Gulley et al. |

FOREIGN PATENT DOCUMENTS

| | | |
|---|---|---|
| JP | 2011-81594 | 4/2011 |
| JP | 2011081594 | 4/2011 |
| WO | 0156221 A2 | 8/2001 |
| WO | WO01/56221 A2 | 8/2001 |
| WO | 2011/056278 A2 | 5/2011 |
| WO | 2014011743 A1 | 1/2014 |
| WO | 2014011746 A1 | 1/2014 |

OTHER PUBLICATIONS

Jim Guilford, Kirk Yap, Vinodh Gopal, "Fast SHA-256 Implementations on Intel Architecture Processors", May 2012, INTEL, pp. 1-18.*

Zalewski, Przemysław, Marcin Łukowiak, and Stanisław Radziszowski. "Case study on FPGA performance of parallel hash functions." Przegląd Elektrotechniczny 86 (2010): 151-155.*

Sklavos, Nicolas, Gregory Dimitroulakos, and O. Koufopavlou. "An ultra high speed architecture for VLSI implementation of hash functions." Electronics, Circuits and Systems, 2003. ICECS 2003. Proceedings of the 2003 10th IEEE International Conference on. vol. 3. IEEE, 2003.*

International Search Report and Written Opinion received for International Application No. PCT/US2013/049887, dated Sep. 27, 2013, 12 pages.

International search Report and Written Opinion received for International Application No. PCT/US2013/049890, dated Aug. 29, 2013, 11 pages.

Gulley et al., "Multi-Hash: A Family of Cryptographic Hash Algorithm Extensions," White Paper, Intel Corporation, Jul. 2012, 16 pages.

Gopal et al., "Processing Multiple Buffers in Parallel to Increase Performance on Intel® Architecture Processors," White Paper, Intel Corporation, Jul. 2010, 24 pages.

Ozturk et al., "New Instructions Supporting Large Integer Arithmetic on Intel® Architecture Processors," White Paper, Aug. 2012, 16 pages.

National Institute of Standards and Technology,"Secure Hash Standard (SHS)," Federal Information Processing Standards Publication 180-4, Mar. 2012, 35 pages.

Ozturk et al., "RSAX Code," rsax_mod_exp_1024_Complete_VS zip package, retrieved from <http://www.intel.com/p/en_US/embedded/hwsw/software/crclicense?id=6336&iid=6337> on Nov. 25, 2012, 112 pages.

Jonsson et al., "Public-Key Cryptography Standards (PKCS) #1: RSA Cryptography Specifications Version 2.1," RFC 3447, Feb. 2003, 72 pages.

RSA Security Inc., "PKCS #1 v2.1: RSA Cryptography Standard," Public-Key Cryptography Standards (PKCS), Jun. 14, 2002, 61 pages.

RSA Security Inc., "PKCS #15 v1.1: Cryptographic Token Information Snytax Standard," Public-Key Cryptography Standards (PKCS), Jun. 6, 2000, 81 pages.

U.S. Appl. No. 13/712,401, filed Dec. 12, 2012, 51 pages.
U.S. Appl. No. 13/707,105, filed Dec. 6, 2012, 57 pages.
U.S. Appl. No. 13/631,763, filed Sep. 28, 2012, 26 pages.

Search Report for European Application No. 13816262.3-1870/2872987, dated Jan. 25, 2016, 7 pages.

Office Action and English Translation for Japanese Patent Application No. 2015-514247, dated Dec. 15, 2015, 15 pages.

Sprengers, Martin, "GPU-based Password Cracking, on the Security of Password Hashing Schemes regarding Advances in Graphics Processing Units," Radbound University Nijmegen, 122 pages.

Notice of Preliminary Rejection for Korean Patent Application No. 10-2014-7034829, dated Oct. 20, 2015, 6 pages.

Japanese Office Action and English Translation for Application No. 2015-515295, dated Jan. 26, 2016, 7 pages.

Tsubouchi, Yuuki, et aL "A SSE-based approach for improving the throughput of SHA-1 computation for Deduplication Storage," vol. 2012-HPC-133, No. 31, 2012 Information Processing society of Japan.

Ohta, Hidenori, et al., "An Improved SHA-1 Implementation Using Data Slicing," The 2010 Symposium on Cryptography and Information Security Takamatsu, Japan, Jan. 19-22, 2010.

Notice of Preliminary Rejection for Korean Patent Application No. 10-2014-7034841, dated Nov. 25, 2015.

Office Action for Chinese Patent Application No. 201380030617.1, dated Jun. 28, 2016, 10 pages.

Sprengers, Martijn, "GPU-based Password Cracking on the Security of Password Hashing Schemes regarding Advances in Graphics Processing Units," Radboud University Nijmegen, Masters of Science Thesis, 122 pages.

Notice of Preliminary Rejection for Korean Patent Application No. 10-2014-7034829, dated May 31, 2016, 6 pages.

Decision on Rejection and English Translation for Chinese Patent Application No. 201380030617.1, dated Sep. 5, 2017, 20 pages.

European Office Action for Patent Application No. 13816262.3-1870, dated Aug. 2, 2017, 6 pages.

First Office Action for Chinese Patent Application No. 201380030617.1 dated Jun. 28, 2016, with translation, 25 pages.

Second Office Action for Chinese Patent Application No. 201380030617.1 dated Feb. 20, 2017, with translation, 18 pages.

European Office Action for European Patent Application No. 13 816 262.3-1218 dated Jun. 14 2018, 7 pages.

* cited by examiner

PARALLEL PROCESSING OF A SINGLE DATA BUFFER

CROSS-REFERENCE TO RELATED APPLICATION

This application claims the benefit of and priority to U.S. Provisional Patent Application Ser. No. 61/670,472, filed Jul. 11, 2012.

BACKGROUND

Software for verifying the security of data files and computer programs is prevalent in many different contexts, such as operating system boot sequences, loading of program code or data files, web browsing, data communication, and data storage. Serial data processing algorithms such as those used for authentication and/or encryption can operate in a chained dependent fashion on a single buffer of data. Those algorithms can be constrained by serial chaining in that the output resulting from the processing of one block of data in the buffer is often required for the processing of a subsequent block.

For example, cryptographic hash functions such as MD5 (Message-Digest Algorithm) and SHA1, SHA256 and SHA512 (Secure Hash Algorithms) can be expensive in terms of computation on general-purpose processors. Such hash functions work sequentially on single buffers of data, updating a hash digest state with the computations derived from each data block and using a number of rounds of processing that are dependent on each other. The sequential processing of the blocks of the single buffer limits the performance on modern processors. Methods such as multi-buffer processing using vector Single Instruction Multiple Data (SIMD) units have been proposed for better performance in applications where it is possible to work on multiple independent data buffers; however, those methods are not applicable to applications involving the hashing of a single buffer. Tree hashing is another technique that has been used, albeit across multiple cores or engines.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
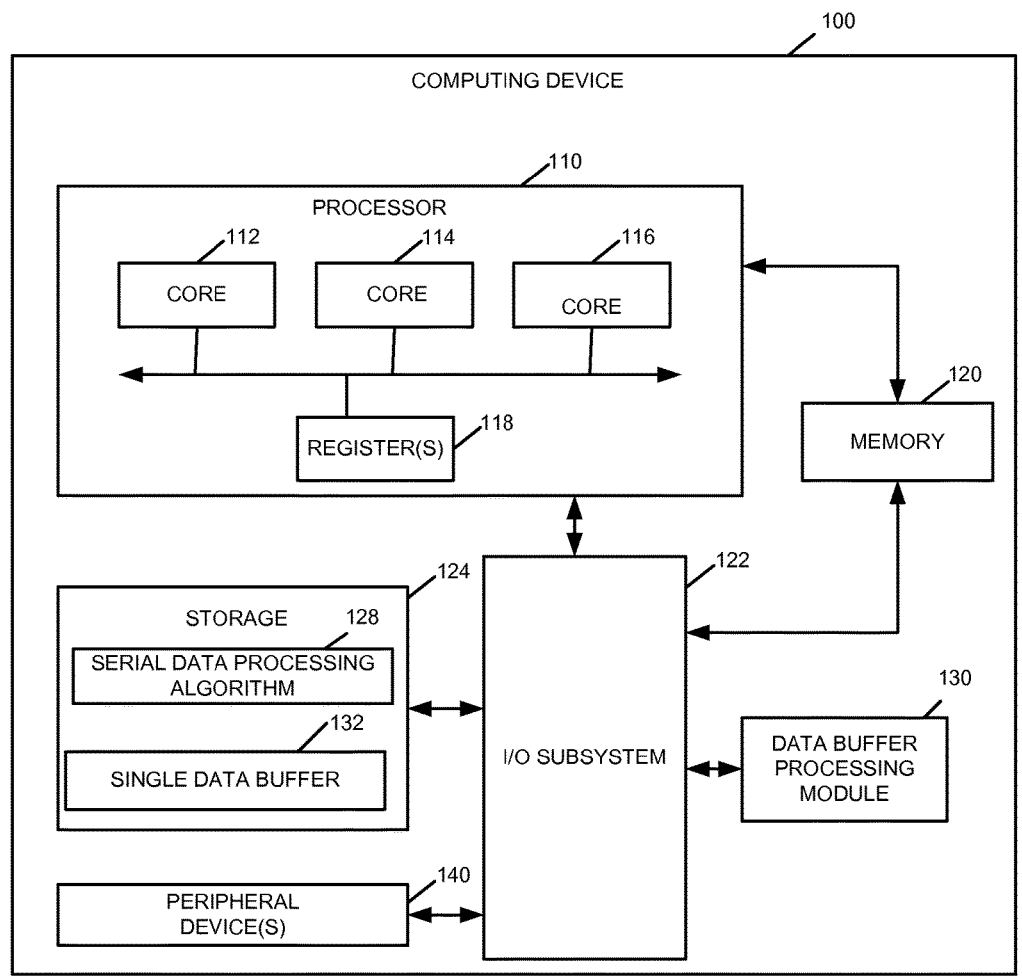
FIG. 1 is a simplified block diagram of at least one embodiment of a computing device in connection with which the disclosed methods may be implemented.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a data buffer processing module 130 is embodied in an illustrative computing device 100. In use, as discussed in more detail below, the data buffer processing module 130 takes as input a single data buffer 132 (e.g., a string or "message" of arbitrary length). The data buffer processing module 130 determines a level of parallelism for the single data buffer 132; that is, a number of "segments" of the single data buffer 132 that can be processed in parallel by a serial data processing algorithm 128 (e.g., a cryptographic hash function). The data buffer processing module 130 manages the parallel processing of the segments and combines the results of the parallel processing to form the final output of the algorithm 128. Although different, the output of the algorithm 128 after such parallel processing has a security strength that is comparable to the results normally achieved by executing the algorithm 128 on a single data buffer in a traditional way (e.g., sequentially). Further, performance gains can be achieved as a result of the segmenting and parallel processing of the single data buffer 132. In this way, the data buffer processing module 130 can perform a serial data processing algorithm on a single data buffer of any arbitrary length, even though the underlying algorithm works on blocks of a specific size (e.g. 64 Bytes).

The illustrative computing device 100 includes at least one processor 110, a memory 120, an input/output (I/O) subsystem 122, a storage device 124, and one or more peripheral devices 140. The computing device 100 may be embodied in or as any type of computing device, such as, for example, a desktop computer system, a laptop or tablet computer system, a server, an enterprise computer system, a network of computers, a handheld or otherwise mobile computing device, or other electronic device, depending on the particular application.

The illustrative processor 110 includes one or more processor cores or logical sections of a single core, e.g., processor cores 112, 114, 116, which are referred to herein simply as "cores" for ease of description. In some embodiments, one or more of the cores 112, 114, 116 is configured to process single-threaded computer programs (such as, in some embodiments, the data buffer processing module 130) using a SIMD (Single Instruction, Multiple Data) instruction set or similar set of computer instructions. More specifically, in some embodiments, at least one of the cores 112, 114, 116 is configured with an instruction set that includes one or more streaming extensions, such as the Streaming SIMD Extensions (SSE) or later versions (e.g., SSEn or AVX (Advanced Vector Extensions)).

The core or cores 112, 114, 116 include or are communicatively coupled to one or more data registers 118. The registers 118 may be utilized to temporarily store data and/or instructions during operation of the serial data processing algorithm 128, the data buffer processing module 130, and/or other components of the computing device 100. Each register 118 has a register size or "width," which is the amount of data the register 118 can store at a given time. At least one of the data registers 118 is configured for data-level parallelism. For example, in some embodiments, at least one data register 118 is configured for SIMD or similar data-level parallel processing; that is, it can be divided into multiple functional units (e.g., "lanes," "data paths," or "execution units") that can perform the same operation on multiple data at the same time or substantially the same time. For example, in a SIMD or similar register having a width of 128 bits, computer instructions can specify a number of lanes or data paths of the register 118 that can each process a portion of the 128 bits of data in parallel, so that the algorithm 128 can be executed on each of the data paths at the same time, independently of the other data paths.

The illustrative cores 112, 114, 116 also include or are communicatively coupled to one or more cache memory (not shown). The cache memory may be utilized to temporarily store data and/or instructions during operation of the serial data processing algorithm 128, the data buffer processing module 130, and/or other components of the computing device 100. In addition to the cache memory and the registers 118, the processor 110 and/or its cores 112, 114, 116 include, or are otherwise communicatively coupled to, the memory 120. Portions of the memory 120 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The processor 110 is also communicatively coupled to the I/O subsystem 122. Although not specifically shown, the I/O subsystem 122 typically includes a memory controller (e.g., a memory controller subsystem or northbridge), an input/output controller (e.g., an input/output controller subsystem or southbridge), and a firmware device. Of course, in other embodiments, I/O subsystems having other configurations may be used. For example, in some embodiments, the I/O subsystem 122 may form a portion of a system-on-a-chip (SoC) and be incorporated, along with the processor 110 and other components of the computing device 100, on a single integrated circuit chip. As such, it will be appreciated that each component of the I/O subsystem 122 may be located on a common integrated circuit chip in some embodiments.

The illustrative I/O subsystem 122 is communicatively coupled to one or more storage devices 124. Portions of the storage 124 may be embodied as any suitable device for storing data and/or instructions, such as disk storage (e.g. hard disks), memory cards, memory sticks, and/or others. In some embodiments, the serial data processing algorithm 128, the data buffer processing module 130, and/or the single data buffer 132 are at least temporarily embodied in the storage device 124. During execution, portions of the serial data processing algorithm 128, the data buffer processing module 130 and/or the single data buffer 132 may be loaded into the memory 120, cache memory, and/or the registers 118, for faster processing or other reasons. In other embodiments, the serial data processing algorithm 128 and the data buffer processing module 130 may each be embodied as software, firmware, hardware, and/or a combination thereof, in various embodiments. Further, the data buffer processing module 130 may be embodied as a sub-module or "extension" of the serial data processing algorithm 128, or as a function, procedure, or library object callable by the serial data processing algorithm 128 and/or other software (e.g., an operating system, a security application, and/or others). For example, the buffer processing module 130 may be embodied as one or more software extensions to an existing or future cryptographic hash algorithm, such as a Secure Hash Algorithm.

The I/O subsystem 122 may be communicatively coupled to one or more peripheral devices 140. The peripheral device(s) 140 may include one or more network interfaces, graphics and/or video adaptors, keyboard, touchscreens, displays, printers, data storage devices, and/or other peripheral devices, depending upon, for example, the intended use of the computing device 100. Further, it should be appreciated that the computing device 100 may include other components, sub-components, and devices not illustrated in FIG. 1 for clarity of the description.

In general, the components of the computing device 100 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Figure 2:
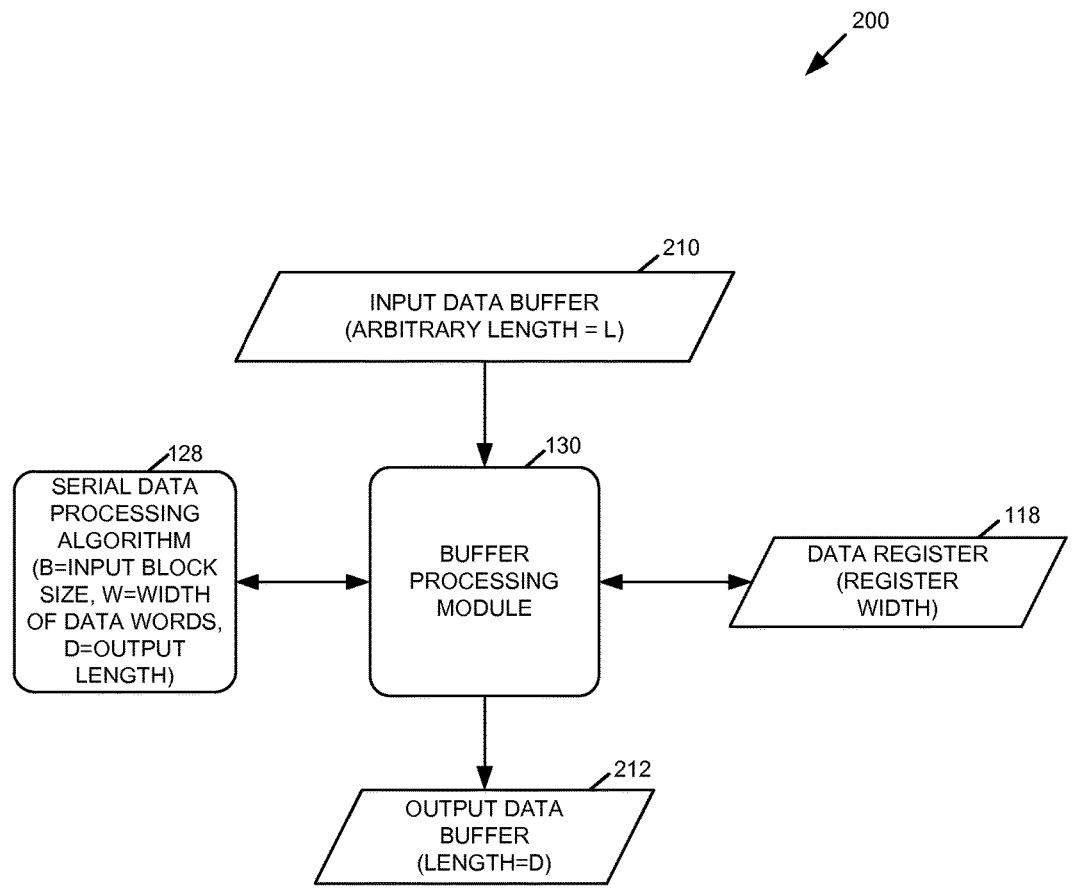
FIG. 2 is a simplified module diagram of at least one embodiment of a system for parallel processing of a single data buffer.

Referring now to FIG. 2, an illustrative system 200 in which the buffer processing module 130 manages parallel execution of the serial data processing algorithm 128 across an input data buffer 210, is shown. The illustrative input data buffer 210 is a string of data characters (e.g., a data file or "message") having an arbitrary size or length L (as measured in, e.g., bits or bytes). As described in more detail below, the buffer processing module 130 divides the input data buffer 210 into a number of segments S, where the number of segments is a positive integer representing the level or degree of parallelism across the input data buffer 210 that is desired or which is possible given the requirements of a particular design or implementation of the system 200. The buffer processing module 130 streams the input data buffer 210 into the data register 118 so that each segment is assigned to a different lane or data path of the register 118. The buffer processing module 130 initiates execution of the algorithm 128 on each lane or data path of the register 118, in parallel, so that each segment of the input data buffer 210 is processed by the serial data processing algorithm 128 concurrently.

The algorithm 128 processes, in parallel, each of the segments of the data buffer 210, serially in data blocks of a specified size B (as measured in, e.g., bits or bytes), where each data block is made up of a number of data words of size W (as measured in, e.g., bits or bytes), such that B is a multiple of W. The algorithm 128 generates an output data buffer (or "message digest," or "hash digest" in some embodiments) 212, which has a fixed length D (as measured in, e.g., bits or bytes). Both the input data buffer 210 and the output data buffer 212 are stored in the single data buffer 132, in the illustrative embodiments. That is, the single data buffer 132 initially corresponds to the input data buffer 210, but is updated as the execution of the buffer processing module 130 and the serial data processing algorithm 128 proceeds.

In some embodiments, the algorithm 128 is a cryptographic hash function such as MD5, SHA1, SHA256, or SHA512, and the data buffer processing module 130 uses as parameters certain specifications of the cryptographic hash function (as defined, e.g., in the relevant Federal Information Processing Standards Publication or FIPS PUB) in determining the number of segments S. As an example, the standards for the SHA256 secure hash function specify that B=512 bits, W=32 bits, and D=256 bits. The standard SHA256 hash function breaks an arbitrary-length input buffer into blocks of size B, and executes a number of computational rounds on each block using, in each round, a word of size W from the block. Each round updates the buffer, such that the output of one round is an input to the subsequent round.

Traditionally, the SHA256 hash function processes the blocks of the input buffer sequentially, such that the hash digest produced for one block is used as the initial hash digest for the processing of the next block, and so on, until each block in the input buffer has been processed. In contrast, the buffer processing module 130 defines multiple segments across a single data buffer, where each segment includes one or more blocks, and applies the algorithm 128 to each of the segments of the data buffer in parallel. For example, if a data register has a width of 256 bits, then the buffer processing module 130 can divide the input data buffer 210 into (register width)/W or 256/32=8 segments and execute the algorithm 128 on each of the 8 segments in parallel.

Figure 3:
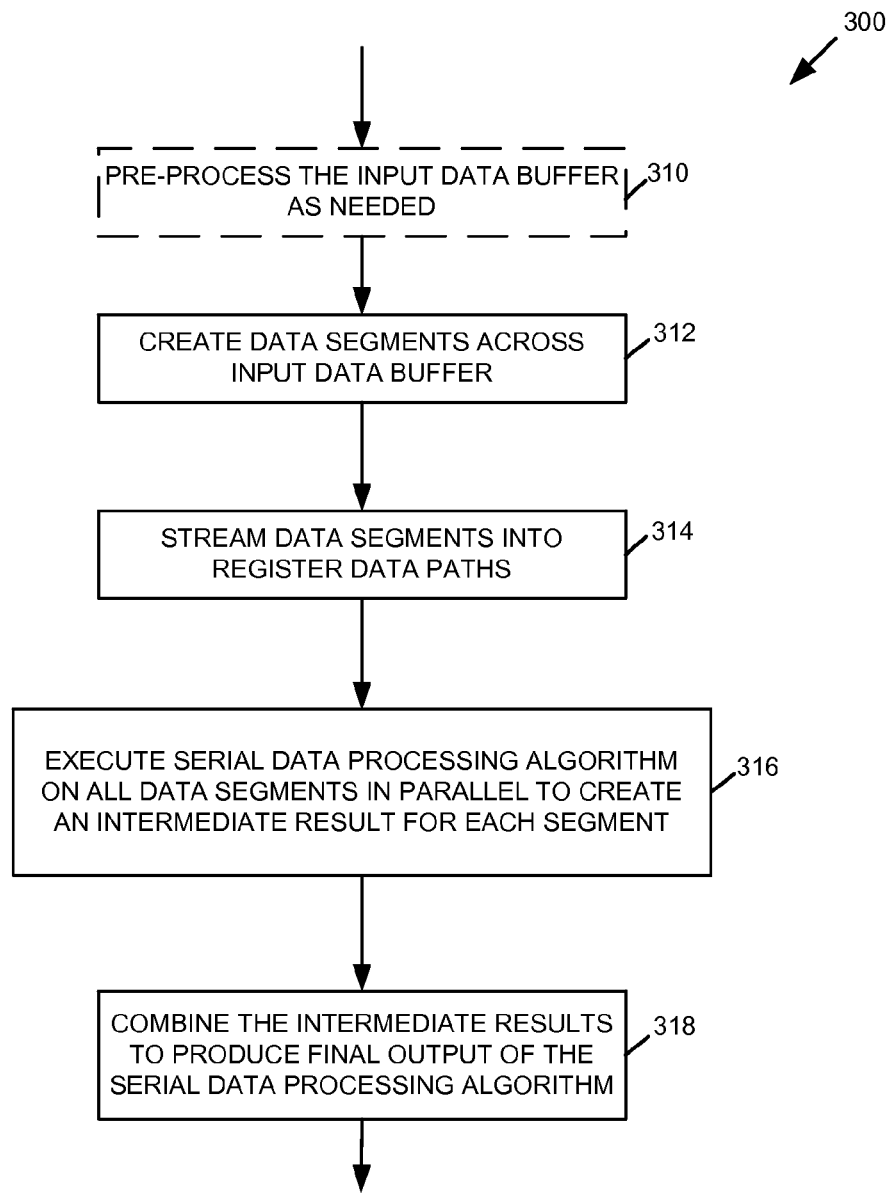
FIG. 3 is a simplified flow diagram of at least one embodiment of a method for parallel processing of a single data buffer.

Referring now to FIG. 3, an illustrative method 300 executable as computerized programs, routines, logic and/or instructions by the buffer processing module 130 and/or other modules or components of the computing device 100, for parallel processing of a single data buffer, is shown. At block 310, the method 300 performs any necessary pre-processing of the arbitrary-length input data buffer or message 210. For example, in the case of cryptographic hash functions, the input data buffer 210 is padded by appending (e.g., by concatenation) a number of data bits to the end of the message until the input data buffer 210 is of a desired length (which is normally specified by the hash algorithm standards or specifications). In some embodiments, the padding includes a "1" bit followed by the necessary number of "0" bits. In other embodiments, other combinations or patterns of "0" and "1" bits may be used in the padding. The standards or specifications that define the underlying algorithm 128 specify the padding scheme. In some embodiments, the buffer 210 is extended by a number of bits sufficient to make the padded buffer the smallest multiple of the block size. Some techniques for pre-processing the input data buffer 210 at block 310 include (1) padding the buffer with a fixed bit pattern concatenated with length until the total length of the buffer 210 is a multiple of B*S. This enables the buffer to be processed efficiently with S-way SIMD processing, generating S digests. The set of digests can then be treated as another data buffer of length S*D, and then a final hash of size D can be generated; and (2) selecting the largest region of the buffer 210 whose length is a multiple of B*S, in parallel, so that S digests can be generated. The set of digests can then be concatenated with the rest of the buffer as a new data buffer, and then a final hash of size D can be generated.

At block 312, the method 300 determines the number of segments S in which to divide the input data buffer 210, and creates the determined number of segments across the input buffer 210. In some embodiments, the number of segments may be pre-determined and simply accessed as a parameter, argument, or stored value (e.g., from a look-up table or database). In other embodiments, the number of segments may be determined at load time or runtime. In some embodiments, the number of segments may be a function of the width of the register 118, the parameters or specifications of the serial data processing algorithm 128 (e.g., block size, word size, output length, etc.), and/or the length of the input data buffer 210. As an example, where an SHA256 hash function is used as the algorithm 128, S=8, W=4 bytes, and B=64 bytes. As another example, executing SHA-1 on a SIMD-capable microprocessor with 128-bit registers would have the following parameter settings: B=64 Bytes, W=4 Bytes, S=4, D=20 Bytes.

Still at block 312, each of the segments is defined as being comprised of data words having a particular width (e.g., 32 bits). In some embodiments, the segment word width corresponds to the word width W specified by the algorithm 128. The segments are each created using every Sth word of the input data buffer 210, such that the length of the segment is evenly divisible by the block size B. The length L of the input data buffer 210 is divided by the segment block size (S multiplied by B, or SB) to determine how much of the input data buffer 210 can be processed in segments of the same size. Where the length L of the input data buffer is not evenly divisible by SB, a final segment comprising the remaining data is created. In the SHA256 example, SB=8*64=512 bytes. Since there are 8 segments, each segment is formed using every $8^{th}$ data word (32 bits, or 4 bytes) in the input data buffer 210, up to 512*N bits, where N is a positive integer and 512*N is less than L. The buffer length L can be represented as L=SB*N+L mod SB, and the segment length SL can be represented as SL=B*N.

At block 314, the method 300 streams or otherwise directly reads the segments into the data paths of the register 118, so that each segment is read into a different data path (using, e.g., interleaving). In some embodiments, this is accomplished by using a single data pointer that is incremented up to SB; that is, until all of the evenly-sized segments have been processed. In the SHA256 example, eight 32-bit words are read into 8 data paths of the register at a time.

At block 316, the serial data processing algorithm 128 is executed on each of the data segments in parallel. That is, for each segment, the algorithm 128 sequentially processes the blocks of that segment, at the same time as the other segments are being similarly processed by the algorithm 128. Thus, an intermediate result (e.g., a hash digest) is created for each segment. The algorithm 128 is also executed on the remaining portion of the input data buffer 210 (if any) and a corresponding intermediate result is created. In the SHA256 example, the SHA256 algorithm is executed on each data path/32-bit word substantially simultaneously, and then the next 8 words are read into the register data paths and processed in parallel by the SHA256 algorithm, and so on, up to the block size B.

At block 318, all of the intermediate results are combined to produce the final output (e.g., hash digest) of the algorithm 128. The intermediate results can be combined in a number of different ways, including using an exclusive-or (XOR) or addition (ADD) function, or by concatenating the intermediate results and then executing the algorithm 128 again. In the SHA256 example, each of the 8 hash digests is combined into one 256 bit hash digest. It should be appreciated by those skilled in the art that the method 300 can be easily adapted to other processor configurations and serial data processing algorithms. For example, registers having other register widths can be used. For example, using the AVX3, which has a width of 512 bits, the number of segments S could be 16 rather than 8, and each segment could be made up of every $16^{th}$ (32-bit) word.

Some embodiments of the method 300 treat the single buffer 210 as a set of segments, which are analogous to interleaved independent buffers, and generate a number of independent hash digests for those segments in parallel. In some embodiments, the number of interleaved segments is a power of 2. The intermediate results from the parallel processing of the segments are processed by the algorithm 128 to form a final result. Generally speaking, some embodiments of the method 300 interleave the data at a finer granularity (e.g., data words), rather than breaking the buffer 210 down into block- or greater-sized processing portions.

Figure 4:
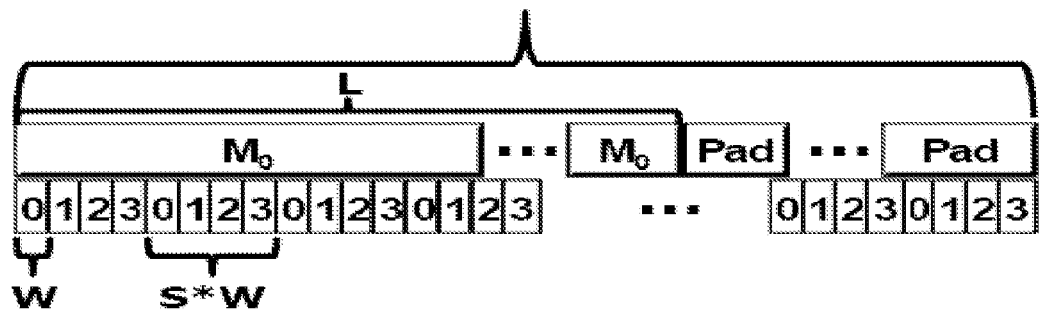
FIG. 4 is a simplified example of at least one embodiment of parallel processing of a single data buffer.
Figure 5:
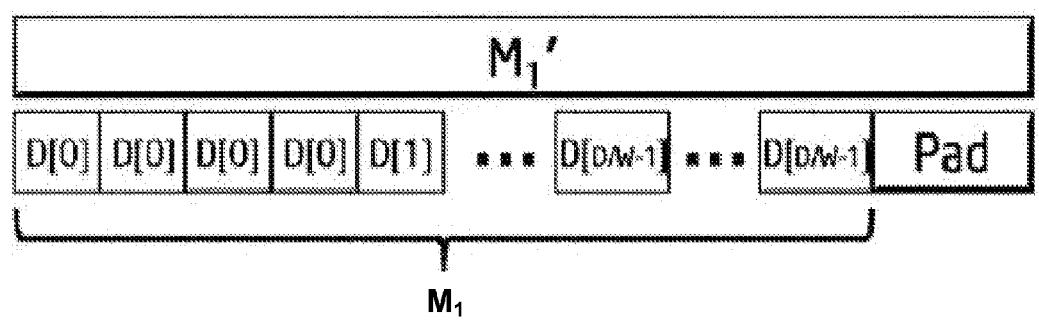
FIG. 5 is a simplified example of at least one embodiment of a result of parallel processing of a single data buffer.

Referring now to FIGS. 3, 4 and 5, an illustrative embodiment of the method 300 uses a hash algorithm H, which is defined to work on an integral number of blocks of size B bytes each. The below embodiment hashes a message $M_0$ of length L with a given level of parallelism S (where the ∥ symbol denotes concatenation). Referring to block 310 of FIG. 3, the message $M_0$ is pre-processed according to the padding function associated with H. The padding function is denoted as $Pad_H$ (Message, Length of Message, Block-size B), and extends the message with a pre-determined pattern and a concatenation of the message length to the smallest length that is a multiple of B bytes. The padding function $Pad_H(M_0, L, B*S)$ is applied to the message $M_0$, generating $M_0'$ of length L,' where L' is the smallest length to which $M_0$ can be extended that is a multiple of B*S bytes.

Referring to block 312 of FIG. 3, the padded message $M_0'$ from block 310 is divided into S segments each of length L'/S. The padded message $M_0'$ is divided in an interleaved fashion such that every word size W-bits of $M_0'$ is assigned to a different segment. Each segment is represented as an array of W-bit words:

$$Seg_0 = M_0'[0] \| M_0'[S] \| M_0'[2S] \| \ldots$$

$$Seg_1 = M_0'[1] \| M_0'[S+1] \| M_0'[2S+1] \| \ldots$$

$$\ldots$$

$$Seg_{S-1} = M_0'[S-1] \| M_0'[(2S-1)] \| M_0'[3S-1] \| \ldots$$

where each $M_0'[n]$ is a word size W index into the padded message. Referring to block 316 of FIG. 3, S leaf-level digests are generated on the segments as $D_k=H(Seg_k)$ for k=0 . . . (S−1). Referring to block 318 of FIG. 3, a new message $M_1$ is created by interleaving the resultant digests from block 316 by every word size W-bits. If $M_1=D_0[0]\|D_1[0] \ldots \|D_{(S-1)}[0]\|D_1[1] \ldots \|D_{(S-1)}[(D/W)-1]$, where each $D_k[n]$ is a word size W index into a segment's digest, then a padded $M_1'$ can be generated as $Pad_H(M_1, S*D, B)$. The hash algorithm H can then be applied to $M_1'$ (e.g., $H(M_1')$).

In some embodiments, the contents of the data buffer 210 aligned in memory is read (e.g., "streamed") directly into SIMD registers without the need for transposing. In some embodiments, the method 300 allows the data being streamed (e.g., from a network connection) to be fed directly into the register 118 without the need to know the length of the buffer 210 at start time. Accordingly, single-thread applications do not have to be modified (other than at the hash algorithm level) to take advantage of the performance benefits of the disclosed parallel processing.

In some embodiments, the algorithm 128 can be selected or ordered based on computation and/or security considerations, and the current (possibly ordered) list of cryptographic hash algorithms in various protocols/standards can be augmented with parallelized versions as disclosed herein (e.g. SHA1x4, SHA1x8, SHA256x4, SHA256x8, etc.).

In some embodiments, e.g., applications involving verifying signatures of files that are securely loaded, the signing entity replaces the existing cryptographic hashing algorithm of the chosen security (e.g. SHA256) with a version of the method 300 that is most efficient to compute for verification. For instance, if the verifying entity has a 128-bit SIMD data-path execution unit in its processor core, and if an SHA256-strength digest is desired, the SHA256x4 algorithm may be desired (as the SHA256 algorithm is 32-bit based, a 128-bit SIMD execution unit can process 128/32=4 segments, in parallel). Thus, instead of using one of the currently used 32-bit algorithms (e.g., MD5, SHA1, SHA256), the verifying entity would use a corresponding MD5 x8, SHA1 x4, SHA256 x4 parallelized algorithm. In some embodiments, additional parallelism may be desired with MD5 due to the algorithm's constrained data-dependency chain, even though only 4 segments are needed from a 128-bit SIMD perspective.

In embodiments where there may be many verifying devices of different computation strengths, the signing entity may need to determine the level of parallelism that works for the majority of its verifying devices. The disclosed embodiments do not require the server to estimate this very accurately, as a larger level of parallelism can be created during signing, and the verifying agents can perform a multi-pass approach during verification, if their SIMD or hardware capability cannot process as many segments as specified, all at once. For example, a signer can use an x4 scheme while a verifying agent could perform two passes of an x2 scheme.

In some embodiments, some loss of efficiency could result if too many passes are needed (due, e.g., to managing multiple state variables of the digests), however, data can still be brought in efficiently in a streaming manner just once. In this case, the application will need to cycle through the sets of state variables. For instance, in some cases, a client device may not have a SIMD unit at all, and needs to perform simple scalar operations to process a SHA256x4 hash. In this case, instead of working with one set of SHA256 state variables (32 Bytes), it will simultaneously work on four such copies of state variables (128 Bytes), cycling through them as it processes words from the data buffer. This increase in state size is very small. However, the working-set size increase associated with message schedules for a block (e.g., for SHA) may be undesirable in some cases. If the increase in working-set size is problematic, one could choose to store four blocks of data and strictly work on one interleaved block at a time. Many other variations are possible, and various embodiments can permit any device to process a parallel hash signature efficiently without undue burden. However, if a fixed hardware engine is designed to perform the entire hash function, including padding, on a given buffer/length input, then the padding can be designed to be the same as the hardware to achieve the same result. If the hardware engine works on a per block basis or has a mode that does not include padding, then it can be used to perform the disclosed multi-hash methods.

Although the disclosed embodiments are capable of large degrees of parallelism (e.g., x32 or x64), it may be desirable in some embodiments to configure the method 300 in accordance with the capabilities of existing devices or reasonably anticipated future devices (e.g., x4 or x8).

In some embodiments, an SHA256x4 version of the method 300 has been shown to provide an approximately 2.6× performance gain over the best SHA256 algorithm computation on a reasonably sized 1 KB data buffer. In some embodiments, an MD5 x8 version of the method 300 has been shown to result in an approximately 4.4× performance gain over the standard MD5 algorithm. The multi-hash performance should scale in proportion to increasing data-path widths of future processors. Further, using the disclosed embodiments, the resulting digest should be at least as secure and collision-resistant as the digest obtained by a direct application of the underlying hash function. In addition to the most commonly used hash functions today, the disclosed embodiments can be adapted for the new SHA3 candidates.

EXAMPLES

Example 1 includes a computing device for processing a data buffer. The computing device includes a data buffer processing module to access an arbitrary-length data buffer having a buffer length and a plurality of data segments, each data segment having a segment length greater than zero and less than the buffer length; directly read the data segments into a data register, the data register having a plurality of data paths, each data segment being read directly into a different data path; perform a serial data processing algorithm on each of the data paths substantially in parallel to produce a result for each data path; and combine the results to form the output of the serial data processing algorithm.

Example 2 includes the subject matter of Example 1, and wherein the data buffer processing module is embodied as an extension to a cryptographic hash algorithm.

Example 3 includes the subject matter of any of Examples 1 and 2, and wherein the data buffer processing module is configured for execution on a single core of a microprocessor of the computing device.

Example 4 includes the subject matter of any of Examples 1-3, and wherein the data buffer processing module is configured for execution on a single thread of the single core.

Example 5 includes the subject matter of any of Examples 1-4, and wherein the data buffer processing module is configured for execution on a single instruction, multiple data-capable processor of the computing device.

Example 6 includes the subject matter of any of Examples 1-5, and wherein the data buffer processing module is configured for use with a single thread software application.

Example 7 includes the subject matter of any of Examples 1-6, and wherein the data buffer processing module is configured for use with a multiple thread software application.

Example 8 includes a method for processing an arbitrary-length data buffer. The method includes defining the data buffer as a plurality of data segments, each data segment having a segment length greater than zero and less than the length of the data buffer; streaming the data segments into a data register, the data register having a plurality of data path execution units, each data segment being streamed into a different data path execution unit using a single data pointer;

executing a serial data processing algorithm in each of the data path execution units substantially in parallel to produce a result for each data path execution unit; and combining the results to form the output of the serial data processing algorithm.

Example 9 includes the subject matter of Example 8, and further including defining the segment length based on the width of the data register and a word size specified by the serial data processing algorithm.

Example 10 includes the subject matter of any of Examples 8 and 9, and wherein defining the data buffer as a plurality of data segments comprises dividing the data buffer into the plurality of data segments in an interleaved fashion.

Example 11 includes the subject matter of any of Examples 8-10, and wherein the data buffer comprises a plurality of data words, wherein each data word comprises a plurality of data bits, and the method comprises assigning each data word in the data buffer to a different data segment so that each data segment comprises an array of data words.

Example 12 includes the subject matter of any of Examples 8-11, and wherein each result comprises a plurality of data words, each data word comprising a plurality of data bits, and the combining comprises interleaving the results by the data words.

Example 13 includes the subject matter of any of Examples 8-12, and wherein executing a serial data processing algorithm comprises executing a cryptographic hash function.

Example 14 includes the subject matter of any of Examples 8-13, including generating a hash digest for each data segment.

Example 15 includes the subject matter of any of Examples 8-14, and further including combining the hash digests to form a new data buffer and executing the cryptographic hash function on the new data buffer.

Example 16 includes the subject matter of any of Examples 8-15, and further including determining a block size associated with the serial data processing algorithm and padding the data buffer so that the length of the buffer is a multiple of the block size.

Example 17 includes the subject matter of any of Examples 8-16, and further including appending a fixed pattern of data bits to the data buffer so that the length of the buffer is equal to the block size multiplied by the number of data segments.

Example 18 includes the subject matter of any of Examples 8-17, and wherein the combining comprises concatenating the results and executing the serial data processing algorithm on the concatenated results.

Example 19 includes the subject matter of any of Examples 8-18, and further including determining the number of data segments based on a characteristic of a microprocessor of the computing device.

Example 20 includes the subject matter of any of Examples 8-19, and further including determining the number of data segments based on a characteristic of the serial data processing algorithm.

Example 21 includes a computing device having a processor and a memory having stored therein a plurality of instructions that when executed by the processor cause the computing device to perform the method of any of Examples 8-20.

Example 22 includes one or more machine readable storage media comprising a plurality of instructions stored thereon that in response to being executed result in a computing device performing the method of any of Examples 8-20.

Example 23 includes one or more machine readable storage media comprising a plurality of instructions stored thereon that in response to being executed result in a computing device dividing the data buffer into plurality of data segments, each data segment having a segment length greater than zero and less than the length of the data buffer; reading each data segment directly into a different data path execution unit of a data register of the computing device; executing a cryptographic hash algorithm on each of the data path execution units substantially in parallel to produce a result for each data path execution unit; concatenating the results produced at the data path execution units; and executing the cryptographic hash algorithm on the concatenated results to produce an output of the cryptographic hash algorithm.

Example 24 includes the subject matter of Example 23, and further including defining the segment length based on the width of the data register and a word size specified by the cryptographic hash algorithm.

Example 25 includes the subject matter of any of Examples 23 and 24, and further including creating the plurality of data segments in an interleaved fashion.

Example 26 includes the subject matter of any of Examples 23-25, and further including determining a block size associated with the cryptographic hash algorithm and padding the data buffer so that the length of the buffer is a multiple of the block size.

Example 27 includes the subject matter of any of Examples 23-26, and further including appending a fixed pattern of data bits to the data buffer so that the length of the buffer is equal to the block size multiplied by the number of data segments.

Example 28 includes the subject matter of any of Examples 23-27, and further including determining the number of data segments based on a characteristic of a microprocessor of the computing device.

Example 29 includes the subject matter of any of Examples 23-28, and further including determining the number of data segments based on a characteristic of the serial data processing algorithm.

Example 30 includes the subject matter of any of Examples 23-29, and wherein the cryptographic hash algorithm comprises a Secure Hash Algorithm or an MD5 Algorithm.

The invention claimed is:

1. A computing device for processing a data buffer, the computing device comprising:
   one or more microprocessors configured with an Advanced Vector Extensions (AVX)-based instruction set providing AVX-based operations; and
   a data buffer processing module to:
      access a data buffer having a buffer length;
      determine a level of parallelism configured for the data buffer indicative of a plurality of data segments of the data buffer to be processed in parallel according to the AVX-based operations;
      define the plurality of data segments for the data buffer based on the level of parallelism configured for the data buffer, wherein each data segment has a segment length greater than zero and less than the buffer length and comprises one or more words;
      directly read the data segments into one or more data registers configured for data-level parallel processing, each data register of the one or more data registers having a plurality of data paths, wherein to directly read the data segments into the one or more data registers comprises to serially read, into any of the one or more data registers, one word from each data segment into a different data path of the same data register;

perform a serial data processing algorithm on each of the data paths of the one or more data registers substantially in parallel to generate a hash digest for each of the plurality of data segments; and perform an addition (ADD) function on the generated hash digests to form a combined hash digest representative of an output of the serial data processing algorithm;

wherein the data buffer processing module is configured for execution on a single thread of a single core of a microprocessor of the one or more microprocessors.

2. The computing device of claim 1, wherein the data buffer processing module is embodied as an extension to a cryptographic hash algorithm.

3. The computing device of claim 1, wherein the data buffer processing module is configured for execution on a single instruction, multiple data-capable processor of the computing device.

4. A method for processing an arbitrary-length data buffer, the method comprising:

determining a level of parallelism configured for the data buffer indicative of a plurality of data segments of the data buffer to be processed in parallel according to one or more Advanced Vector Extensions-based operations;

defining the data buffer as the plurality of data segments determined based on the level of parallelism configured for the data buffer, wherein each data segment has a segment length greater than zero and less than the length of the data buffer and comprises one or more words;

streaming each of the data segments into one or more data registers configured for data-level parallel processing, each data register of the one or more data registers having a plurality of data path execution units, wherein streaming each of the data segments into the one or more data registers comprises serially streaming, into any of the one or more data registers, one word from each data segment into a different data path execution unit of the same data register using a single data pointer;

executing a serial data processing algorithm in each of the data path execution units of the one or more data registers substantially in parallel to generate a hash digest for each of the plurality of data segments; and performing an addition (ADD) function on the generated hash digests to form a combined hash digest representative of an output of the serial data processing algorithm;

wherein the method is executed by a single thread.

5. The method of claim 4, comprising defining the segment length based on the width of the data register and a word size specified by the serial data processing algorithm.

6. The method of claim 4, wherein defining the data buffer as a plurality of data segments comprises dividing the data buffer into the plurality of data segments in an interleaved fashion.

7. The method of claim 4, wherein each result comprises a plurality of data words, each data word comprising a plurality of data bits, and the combining comprises interleaving the hash digests by the data words.

8. The method of claim 4, wherein executing a serial data processing algorithm comprises executing a cryptographic hash function.

9. The method of claim 4, wherein combining the generated hash digests forms a new data buffer, and further comprising, executing the cryptographic hash function on the new data buffer.

10. The method of claim 4, comprising determining a block size associated with the serial data processing algorithm and padding the data buffer so that the length of the buffer is a multiple of the block size.

11. The method of claim 10, comprising appending a fixed pattern of data bits to the data buffer so that the length of the buffer is equal to the block size multiplied by the number of data segments.

12. The method of claim 4, comprising determining the number of data segments based on a characteristic of one or more of a microprocessor of the computing device and a characteristic of the serial data processing algorithm.

13. One or more machine readable storage media comprising a plurality of instructions stored thereon that in response to being executed result in a computing device:

determining a level of parallelism configured for the data buffer indicative of a plurality of data segments of the data buffer to be processed in parallel according to Advanced Vector Extensions (AVX)-based operations;

dividing the data buffer into the plurality of data segments based on the level of parallelism configured for the data buffer, wherein each data segment has a segment length greater than zero and less than the length of the data buffer and comprises one or more words;

reading each of the data segments directly into one or more data registers of the computing device, each data register of the one or more data registers configured for data-level parallel processing and having a plurality of data path execution units, wherein readying each of the data segments directly into the one or more data registers comprises serially reading, directly into any one of the one or more data registers, one word from each data segment into a different data path execution unit of the same data register of the computing device;

executing a cryptographic hash algorithm on each of the data path execution units of the one or more data registers substantially in parallel to generate a hash digest for each of the plurality of data segments;

performing an addition (ADD) function on the generated hash digests to form a combined hash digest representative of an output of the serial data processing algorithm;

executing the cryptographic hash algorithm on the combined results to produce an output of the cryptographic hash algorithm, wherein the plurality of instructions are configured to be executed on a single thread of a processor of the computing device.

14. The one or more machine readable storage media of claim 13, wherein the cryptographic hash algorithm comprises a Secure Hash Algorithm or an MD5 Algorithm.

* * * * *